Sept. 17, 1929.  F. W. FIKAN ET AL  1,728,886
AUXILIARY FEEDING ATTACHMENT FOR COMBINED HARVESTERS AND THRASHERS
Filed April 9, 1927  4 Sheets-Sheet 3
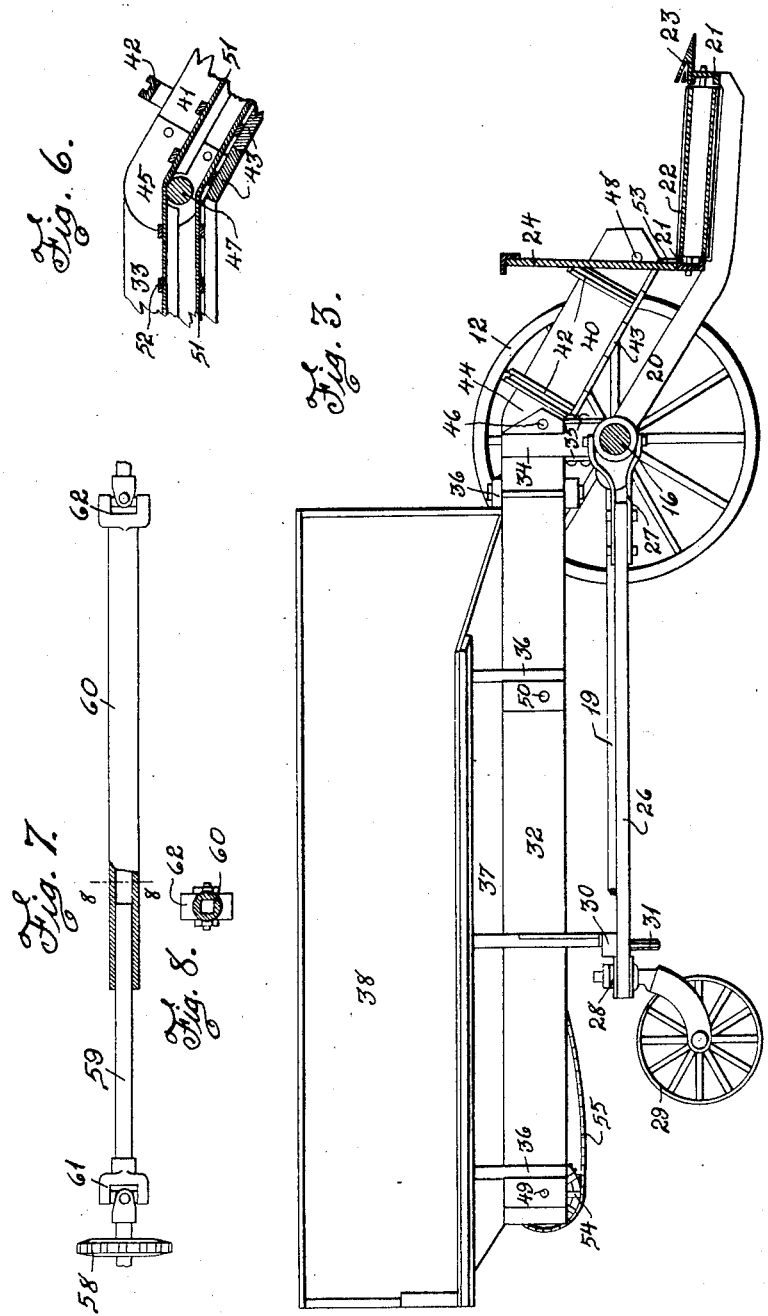
Inventors:
Frank W. Fikan.
Will H. Fikan.
By Silas C. Sweet.
Attorney.

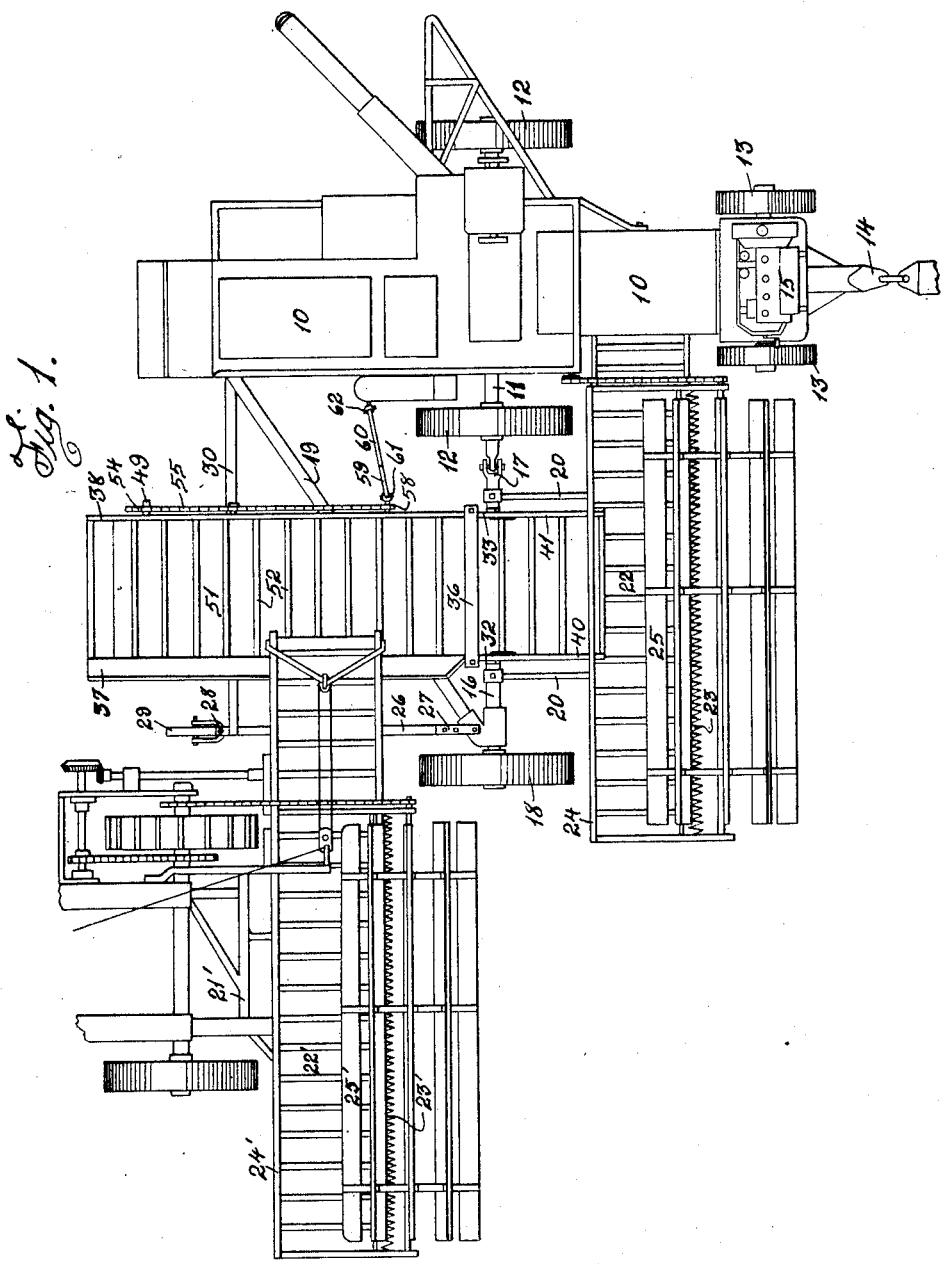

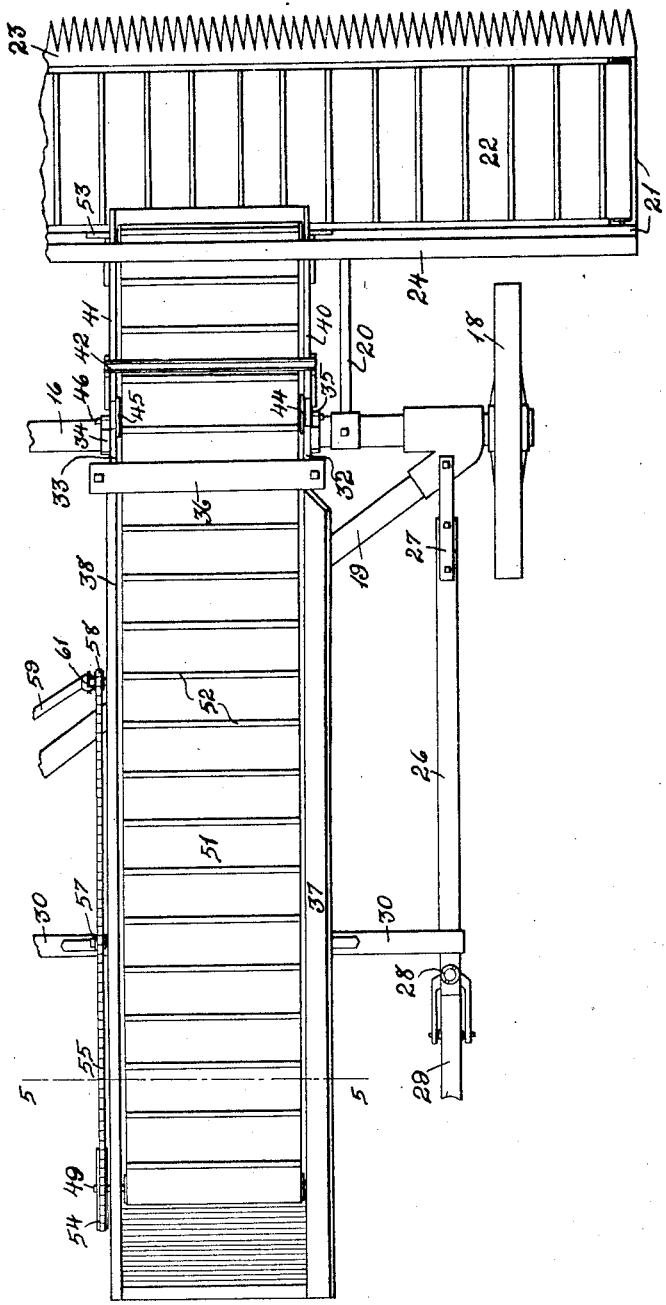

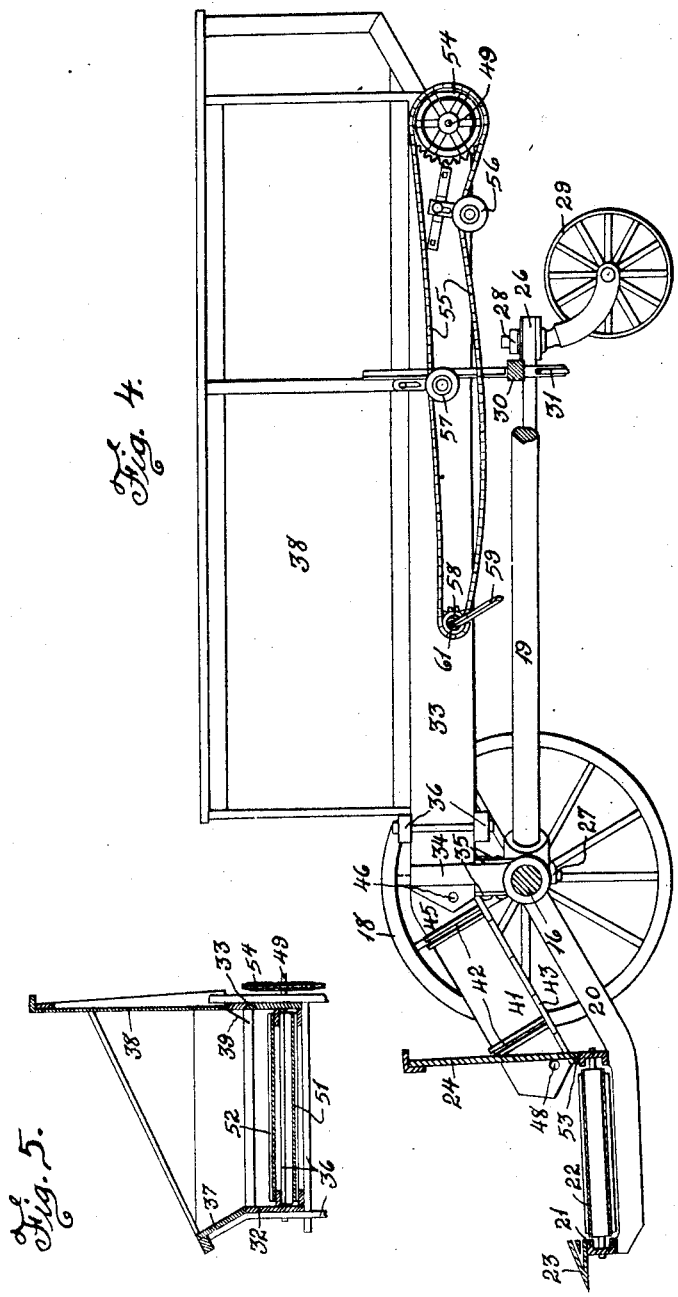

Patented Sept. 17, 1929

1,728,886

UNITED STATES PATENT OFFICE

FRANK W. FIKAN AND WILL H. FIKAN, OF RAWLINS COUNTY, KANSAS

AUXILIARY FEEDING ATTACHMENT FOR COMBINED HARVESTERS AND THRASHERS

Application filed April 9, 1927. Serial No. 182,284.

This invention relates to improvements in harvesting machinery and more particularly to improvements in machinery adapted for the harvesting of small grains such as oats, wheat, barley and the like, with particular reference to machines known as combined harvesters and thrashers, wherein provision is made for harvesting and thrashing grain in a continuous operation as the machine traverses a field; an object of the invention being to provide novel and improved means whereby supplementary harvesting means may be employed in conjunction with a combined harvester and thrasher.

A further object of the invention is the provision of improved means adapted to be attached to a combined harvester and thrasher and used in combination with independent harvesting means to the end of increasing the width of the swath of grain harvested in a given traverse of the field.

A further object of the invention is to be found in the provision of improved means to be attached to a combined harvester and thrasher and adapted for use in combination with an independent harvester, whereby grain harvested by the independent means is received into and thrashed by the thrashing means of said combined harvester and thrasher.

A combined harvester and thrasher is provided with harvesting means adapted to cut standing grain in a field and convey the severed heads of said grain to thrashing means forming an integral part of the machine. It often happens that the stand of grain will be light and the cut of the harvesting means will be only a fraction of the thrashing capacity of the machine, thus resulting in inefficient operation of the machine. When such a condition exists, it is desirable that some means be provided for increasing the amount of cut grain delivered to the thrashing mechanism, which can very readily be done by operating an independent harvester or header in conjunction with the combined machine in such a way as to convey the entire cut of both machines to the single thrashing means. It is the object of our invention to provide simple, positive, and inexpensive means that may be readily attached to the combined harvester and thrasher in order to receive the grain harvested by the independent means and convey said grain to the thrashing mechanism.

Our invention consists in the construction, arrangement and combination of elements hereinafter set forth, pointed out in our claims and illustrated by the acompanying drawings, in which—

Figure 1 is a plan of a combined harvester and thrasher equipped with our improvement, an independent harvester or header being shown in operative relation thereto. The combined harvester and thrasher and the independent harvester, being old and well known and forming no part of our invention, are shown conventionally and without regard to accuracy of detail. Figure 2 is a plan view, on an enlarged scale relative to Figure 1, of our improved attachment, such parts, only, of the combined harvester and thrasher as are necessary to show the mounting of the improvement, being illustrated. Figure 3 is a side elevation, on the same scale as Figure 2, of our improved attachment, certain parts of the combined harvester and thrasher being omitted and other parts being shown in section. Figure 4 is a side elevation, on the same scale as Figure 3 and opposite thereto, of our improved attachment, parts of the combined harvester and thrasher being omitted and other parts being shown in section. Figure 5 is a cross-section on the indicated line 5—5 of Figure 2, portions of the driving mechanism being omitted. Figure 6 is a fragmentary, detail cross-section, on an enlarged scale, of a hinge construction employed in our improvement. Figure 7 is an elevation, partly in section, and on an enlarged scale, of a drive shaft employed in our improvement. Figure 8 is a cross-section on the indicated line 8—8 of Figure 7.

Combined harvesters and thrashers differ somewhat in details of construction, but in each are to be found substantially the features illustrated in the drawings herewith. The thrashing mechanism is variously housed as indicated at 10, the whole being supported by frame members carried by a transverse axle 11, which is in turn supported by wheels 12, the forward end of the frame being supported on a pivoted truck 13 provided with draft connections 14. A prime mover 15, such as an internal combustion engine, is mounted at some convenient place and serves, through the proper connections, to drive the mechanism of the thrasher. An extension 16 extends laterally of the thrasher from one end of the axle 11, is provided with a universal joint 17 adjacent its inner end and is supported at its outer end by a wheel 18; a bracing member 19 being provided to position and hold the outer end of said extension. Similar, spaced arms 20 are secured to and extend forwardly from the extension axle 16 and a header platform comprising a frame 21, conveyor canvas 22, sickle bar and guard 23, wind guard 24 and reel 25, together with the necessary driving means and connections, is mounted on the forward ends of said arms 20, carried thereby and adjustably positioned through the range of a vertical arc by manually controlled rotation of the axle extension 16. The independent harvester or header shown in Figure 1 is a conventional illustration of a common type adapted for independent harvesting and is provided with a frame 21', conveyor canvas 22', sickle bar and guard 23', wind guard 24', reel 25', supporting and traction wheels and connections whereby the various moving parts may be driven from and by the traction wheels. One end of the canvas conveyor 22' extends laterally and upwardly from the independent header and forms an elevator adapted to deliver the grain cut by the machine. In the construction of our improvement, a frame member 26 is mounted in trailing relation near the outer end of the extension axle 16; the forward end of said frame member being provided with a yoke 27 adapted to embrace a fitting connecting said axle extension and the bracing member 19 and be bolted thereto; the trailing or rearward end of said frame member being provided with a swivel bearing 28 in which is mounted the shank of a castor wheel 29 whereby said frame member is positioned and carried. A frame bar 30 is mounted parallel with and rearwardly of the axle extension 16 and rigidly connects the rearward end of the member 26 with the frame of the thrasher, said frame bar 30 being preferably trussed, as indicated at 31. On the rectangular frame thus formed by the axle extension 16, member 26 and bar 30 is mounted a conveyor box at right angles to the header platform of the machine, said conveyor box comprising a relatively long rigid portion and a relatively short hinged portion adapted for cooperative operation. The rigid portion of the conveyor box comprises relatively long, thin side members 32, 33, mounted in parallel, spaced relation with their forward ends projecting very slightly beyond the axle extension 16 and their rearward ends connected so as to form a U-shaped frame, which frame is open at top and bottom and at its forward end. The U-shaped frame above described is supported intermediate its ends by braces secured to and rising from the frame bar 30, and at its forward end by blocks 34 secured to the forward outside ends of the side members 32 and 33, which blocks extend downwardly below said side members into engagement with the axle extension 16, in which relation they are retained by straps 35 secured to margins of said blocks and passing beneath said axle extension. Suitable braces, spacing blocks and clamps, indicated at 36, are provided to rigidly retain the various elements of the frame in their desired relation. The upper margin of the side member 32 is provided with an inclined extension 37, throughout the major portion of its length, which extends upwardly and outwardly from said side member to aid in receiving and directing grain into the conveyor box. A similar inclined extension, for the same purpose, is provided at the rear of said box. A wind screen, 38, is secured to and extends upwardly from the upper margin of the side member 33, it being the function of this screen to prevent grain from being blown or thrown beyond said member; an apron 39 being interposed between said screen and side member and inclined inwardly and downwardly to direct grain more nearly into the center of the conveyor box. The hinged portion of the conveyor box is formed of similar, spaced side members 40, 41, secured in the desired interrelation by U-shaped yokes 42 and bottom members 43 to form a trough open at either end. Metal hinge plates 44, 45, of a width substantially equal to that of the side members 40 and 41, are rigidly secured to the inner faces of said side members adjacent one end of said trough and project therebeyond, the projecting ends of said hinge plates being arcuate. Registering holes are formed in the hinge plates 44 and 45 and forward ends of the side members 32 and 33 and the shaft 46 of a roller 47 is adapted to be received in said holes and form a pivot whereby the shorter section of the conveyor box is hingedly secured to the forward end of the longer section; the roller 47 being thus mounted for rotation between the side members of said conveyor box. Conveyor rollers similar to the roller 47 are journaled transversely of the conveyor box, one at the forward end of the hinged section as indicated by the shaft 48, another at the rear end of the rigid section as indicated by the shaft 49 and such intermediate rollers as indicated by the shaft 50 as may be desired, and an endless conveyor canvas 51, preferably equipped with transverse slats 52, is mounted for travel on and about said rollers and extends the length of said conveyor box. The forward free end of the hinged section of the conveyor box is adapted to extend through an opening formed in the wind guard 24 of the harvesting platform, a transverse trip, 53, secured beneath the forward end of said section being adapted to rest on the rear member of the frame 21, thus positioning the forward end of said hinged section adjacent the conveyor canvas of the header platform and in discharging relation thereto. It is readily apparent that as the header platform is adjusted through the range of its vertical arc the forward end of the hinged section of the conveyor box will maintain its desired relation with said header platform through articulation of the hinge connection at its other end. A chain sprocket 54 is fixed to the end of the roller shaft 49 adjacent the thrasher, and a chain 55 in the form of an endless loop is passed about said sprocket and leads, over adjustable idlers 56 and 57, to and about a chain sprocket 58 mounted for free rotation in a desired location on the side member 33. A telescoping drive shaft having a squared member 59 adapted for sliding engagement in the squared bore of a tubular member 60, is provided with universal joints 61 and 62 adjacent the ends of either member and serves to connect the axis of the chain sprocket 58 with the end of one of the shafts of the thrashing mechanism driven by the prime mover 15, the lower shaft of the primary elevator being particularly well located for this connection in certain types of combined harvesters and thrashers. Thus is the conveyor canvas 51 driven by the prime mover 15, through the telescoping drive shaft, sprocket 58, chain 55, sprocket 54 and roller 49, at all times when the thrashing mechanism of the machine is in operation and without regard to the traction of the machine or its relative movement over the ground.

When the stand of grain in a field is light, or when it is deemed desirable to feed more grain to the thrashing mechanism than is delivered by the harvesting mechanism of the single machine, our improvement may be readily attached and connected to the combined harvester and thrasher as hereinbefore described; an independent header accompanying the combined machine in the field in such a relation as to cut behind and beyond the combined machine, which relation will so position the delivery of the independent machine that the grain cut thereby will be delivered to the longitudinal conveyor of our improvement and thereby to the conveyor of the combined harvester, from whence, with the grain cut by the combined machine, it will be carried to the thrashing mechanism. The length of the longitudinal conveyor, the inclined extension at its rear and receiving side and the wind screen, permit considerable variation in the relative position of the machines without loss of grain and since the auxiliary conveyor is driven from the prime mover, no increase is made in the draft of the combined machine and the speed of said conveyor is uniform, positive and not dependent on the tractive effect of the machine.

We claim as our invention—

1. An auxiliary feeding attachment for combined harvesters and thrashers having a laterally-extending axle supporting a header platform, comprising an auxiliary frame adapted to be attached to said combined machine and laterally-extending axle, a caster wheel supporting the trailing end of said auxiliary frame, a conveyor box having a fixed section rigidly secured to and carried by said laterally-extending axle and auxiliary frame and a movable section hinged for vertical adjustment to the forward end of said fixed section with its free end supported and carried by the header platform of said combined machine, an endless conveyor roller-mounted in both sections of said conveyor box and adapted to deliver to the header platform of said combined machine and connections between said conveyor and independently driven parts of said thrasher whereby said conveyor may be actuated therefrom.

2. The combination with the header platform of a combined harvester and thrasher having a laterally-extending axle supporting said header platform, of a longitudinally-extending conveyor box having a fixed section rigidly carried by said laterally-extending axle and an auxiliary frame, a movable section hinged for vertical adjustment to the forward end of said fixed section and having its free end supported by said header platform, a single endless conveyor belt roller-mounted within both said sections and adapted to deliver to said header platform and connections between said conveyor belt and independently driven parts of said thrasher whereby the former may be driven by the latter.

3. The combination with a combined harvester and thrasher having a laterally-extending axle supporting a header platform, of an auxiliary feeding attachment comprising an auxiliary frame, a caster wheel supporting the trailing end of said frame, a conveyor box having a rigid section mounted on said frame and laterally-extending axle behind and at right angles to the header platform of said machine and a hinged section pivotally connected to the forward end of said rigid section with its free end supported by said header platform, a single endless conveyor belt roller-mounted within both said sections and driving connections between said conveyor belt and independently driven parts of the thrasher mechanism of said combined machine.

Signed at Atwood, in the county of Rawlins and State of Kansas, this 28 day of March, 1927.

FRANK W. FIKAN.
WILL H. FIKAN.